(12) United States Patent
Kurz

(10) Patent No.: US 8,590,859 B2
(45) Date of Patent: Nov. 26, 2013

(54) SOLENOID VALVE AND DRIVER ASSISTANCE DEVICE

(75) Inventor: Edgar Kurz, Heilbronn-Horkheim (DE)

(73) Assignee: Robert Bosch GmbH, Stuttgart (DE)

( * ) Notice: Subject to any disclaimer, the term of this patent is extended or adjusted under 35 U.S.C. 154(b) by 256 days.

(21) Appl. No.: 12/976,651

(22) Filed: Dec. 22, 2010

(65) Prior Publication Data

US 2011/0147628 A1    Jun. 23, 2011

(30) Foreign Application Priority Data

Dec. 23, 2009 (DE) .......................... 10 2009 060 296
Jan. 14, 2010 (DE) .......................... 10 2010 000 901

(51) Int. Cl.
*F16K 31/02* (2006.01)
*F01L 3/10* (2006.01)

(52) U.S. Cl.
USPC .................... 251/129.15; 251/337; 251/64

(58) Field of Classification Search
USPC .................................................. 251/337, 64
See application file for complete search history.

(56) References Cited

U.S. PATENT DOCUMENTS 7,240,893 B2 * 7/2007 Komaba et al. .......... 251/129.04

FOREIGN PATENT DOCUMENTS

CN        101522490 A     9/2009
DE   10 2006 047 923 A1  4/2008

* cited by examiner

*Primary Examiner* — John K Fristoe, Jr.
*Assistant Examiner* — Kevin E Lynn
(74) *Attorney, Agent, or Firm* — Maginot, Moore & Beck

(57) ABSTRACT

The disclosure relates to a solenoid valve (1) having a solenoid armature (2) which is operatively connected to a sealing element (5) of the solenoid valve (1) in order to move the same, and an armature opposing piece (16) which engages, at least in certain areas, in a receptacle opening (23) in the solenoid armature (2). There is provision here for the armature opposing piece (16) to be composed of a pole core (19) and an intermediate component (20) which is supported on the pole core (19), wherein only the intermediate component (20) is arranged at least in certain areas in the receptacle opening (23), and at least one venting opening (33, 36), which produces a fluid connection between the receptacle opening (23) and the surroundings of the solenoid armature, is formed in the intermediate component (20). The disclosure also relates to a driver assistance device.

19 Claims, 4 Drawing Sheets

SOLENOID VALVE AND DRIVER ASSISTANCE DEVICE

This application claims priority under 35 U.S.C. §119 to both (i) German patent application no. 10 2009 060 296.8, filed Dec. 23, 2009, and (ii) German patent application no. 10 2010 000 901.6, filed Jan. 14, 2010. The disclosures of the two (2) above-identified German patent applications are incorporated herein by reference in their entirety.

BACKGROUND

The disclosure relates to a solenoid valve having a solenoid armature which is operatively connected to a sealing element of the solenoid valve in order to move the same, and an armature opposing piece which engages at least in certain areas in a receptacle opening in the solenoid armature.

Solenoid valves of the type mentioned at the beginning are known from the prior art. They are used, for example, for driver assistance devices, that is to say in particular in conjunction with ABS systems, TCS systems or ESP systems. The solenoid valves are embodied, for example, as 2/2-way valves, which can be open in the currentless state or else closed in the currentless state. In such a solenoid valve, the sealing element is usually arranged in such a way that it can be moved in its axial direction in order to interact, in a closed position, with a valve seat of the solenoid valve in a seal-forming fashion and therefore to interrupt a continuous fluid connection through the solenoid valve. If, on the other hand, the sealing element is moved into a release position, it releases the valve seat so that fluid can flow through the solenoid valve, and the continuous fluid connection is therefore produced. The sealing element is moved by means of a solenoid armature. For this purpose, the solenoid armature is arranged in the region of at least one coil. If the coil is currentless, the solenoid armature is in its home position, wherein this home position can be the closed position (solenoid valve which is closed in the currentless state) or the released position (solenoid valve which is opened in the currentless state). For this purpose, the sealing element is operatively connected to the solenoid valve, and therefore has, for example, a rigid connection thereto.

The solenoid armature forms, together with the armature opposing piece, a magnetic part of the solenoid valve. In this context, the solenoid armature and the armature opposing piece are arranged with respect to one another in such a way that the end faces of the two elements face one another. For example, the solenoid armature and the armature opposing piece are oriented in such a way that a respective longitudinal axis runs coaxially with respect to or in parallel with a longitudinal axis of the solenoid valve. The armature opposing piece can be assigned to the coil of the solenoid valve.

From the prior art it is known that the end faces of the solenoid armature and armature opposing piece are of flat design and at the same time run substantially parallel with one another. However, it is also known to provide either the solenoid armature or the armature opposing piece with a receptacle opening, wherein the respective other element engages, at least in certain areas, in this receptacle opening. It is therefore possible to provide, for example, that the solenoid armature has the receptacle opening, and the armature opposing piece engages therein at least in certain areas. Conversely, it is, of course, also possible for the armature opposing piece to have the receptacle opening, the solenoid armature engaging therein at least in certain areas.

In this context there is merely provision that the engagement, at least in certain areas, in at least one position of the solenoid armature or of the sealing element is ensured. Accordingly, it is also possible to provide that in at least one position the armature opposing piece is arranged completely outside the receptacle opening in the solenoid armature. What is referred to as a plunger stage is formed by the receptacle opening of the solenoid armature and the armature opposing piece which engages therein (or the receptacle opening of the armature piece with the solenoid armature which is arranged therein at least in certain areas), that is to say the engagement of the solenoid armature and the armature opposing piece in one another.

From the prior art it is known to embody the plunger stage as a single plunger stage or as a double plunger stage or as a multiple plunger stage. In the former case the receptacle opening has constant dimensions over its axial extent, at least in the area which accommodates the armature opposing piece. In contrast, in the case of the double plunger stage there is provision for the receptacle opening to be formed with two different dimensions over its axial extent, wherein the armature opposing piece is matched in each case to these dimensions, that is to say is also present with different dimensions. Of course, it is also possible to form a multiple plunger stage with any desired number of gradations of the dimensions.

In the arrangement of the armature opposing piece in the receptacle opening of the solenoid armature, the armature opposing piece and the solenoid armature must not be in contact with one another in the radial direction. For this reason, a radial gap, which is present, for example, as an annular gap, is formed between the two elements. For this reason, in such a plunger stage it is necessary to ensure precise guidance of the solenoid armature. This usually results in stringent tolerance requirements for many parts of the solenoid valve, in particular for the solenoid armature and the armature opposing piece, as well as for the guidance or bearing of the solenoid armature in the solenoid valve. For this reason, the manufacture of such a solenoid valve is comparatively complex and therefore costly.

SUMMARY

In contrast, the solenoid valve of the present disclosure has the advantage that it can be manufactured more easily and cost-effectively. In this respect the disclosure provides that the armature opposing piece is composed of a pole core and an intermediate component which is supported on the pole core, wherein only the intermediate component is arranged at least in certain areas in the receptacle opening, and at least one venting opening, which produces a fluid connection between the receptacle opening and the surroundings of the solenoid armature, is formed in the intermediate component. A multi-part, in particular two-part, design of the armature opposing piece is therefore provided. In this way, the solenoid valve can be equipped with a plunger stage, wherein at the same time simple and cost-effective manufacture is ensured. The plunger stage improves the adjustability of the solenoid valve or of the solenoid armature compared to a design of the solenoid armature and armature opposing piece with planar end faces. In particular, in this context a flatter, more linear profile of the characteristic curve of the solenoid valve—in which the actuating force or magnetic force is applied over a distance between the solenoid armature and the armature opposing piece—is obtained. The intermediate component is usually merely applied to the pole core, that is to say is not fixedly connected thereto. The intermediate component is therefore merely supported on the pole core or is pushed in the direction of the pole core by the solenoid armature or a spring element which is assigned thereto. In such an embodiment of the armature opposing piece composed of the pole core and intermediate component there is provision that the pole core does not engage in the receptacle opening in the solenoid armature. The pole core and solenoid armature are advantageously spaced apart from one another, but they can also bear one against the other with their end faces. In one advantageous embodiment of the solenoid valve, the intermediate component is formed as a multiple plunger stage, that is to say has at least two different dimensions in the axial direction. For example, an area of the intermediate component which faces the pole core can be present as a supporting element with which the intermediate component is supported on the pole core, and a further area which faces the solenoid armature, is embodied as a guiding device with which, for example, a guide for a spring element, which is arranged between the intermediate component and the solenoid armature, interacts. In this embodiment, the characteristic curve of the solenoid valve can also be improved compared to a solenoid valve with a single plunger stage, which is known from the prior art. Basically, with the solenoid valve according to the disclosure it is possible to ensure that there is a large number of parts which are identical to those of other solenoid valves. In particular, in this context there are parts tolerances and mounting tolerances which remain unchanged compared to solenoid valves in which the solenoid armature and the armature opposing piece merely have planar end faces. In this way, there is a cost advantage over solenoid valves with a single plunger stage or multiple plunger stage, wherein better adjustability and/or an optimized characteristic curve are/is achieved. The end faces of the solenoid armature and armature opposing piece are usually also referred to as pole faces. It is particularly advantageous if the intermediate component and the pole core are materially uniform, that is to say are composed of the same material.

When the solenoid armature moves in the direction of the armature opposing piece, the intermediate component is moved further into the receptacle opening. Conversely, the intermediate component can be moved in the direction of a mouth of the receptacle opening or through the latter if the solenoid armature moves away from the armature opposing piece or the pole core. Due to the arrangement of the intermediate component in the receptacle opening, the space which is formed by the intermediate component in the receptacle opening is insulated in terms of fluid from the surroundings of the solenoid armature. This means that initially the fluid cannot flow between the space and the surroundings. If the intermediate component is moved in the receptacle opening, the volume of the space changes. Since the fluid cannot move out of the space or into it, a fluid pressure may therefore be present in the space which counteracts a movement of the intermediate component in the receptacle opening. This is disadvantageous for the adjustability of the solenoid valve since the switching times which can be achieved with the solenoid valve are limited by the maximum possible movement speed of the intermediate component in the receptacle opening. For this reason, the venting opening is provided in order to produce the fluid connection between the receptacle opening or the space enclosed by the intermediate component and the surroundings. This venting opening is formed in or on the intermediate component. Given suitable geometry of the intermediate component, it is possible to implement guidance of the fluid through the venting opening which is expedient in terms of flow and therefore a low flow resistance when the fluid flows out of or into the receptacle opening.

One development of the disclosure provides that the solenoid armature can be moved by means of a coil, and the armature opposing piece is arranged in a substantially positionally fixed fashion in the solenoid valve. The solenoid valve therefore has the coil, in the region of which the solenoid armature is arranged. The solenoid armature is axially movable here with respect to further areas of the solenoid valve, in particular of the armature opposing piece. The armature opposing piece is assigned, for example, to the coil of the solenoid valve and at the same time arranged in a substantially positionally fixed fashion. When the solenoid valve moves, this accordingly occurs substantially with respect to the armature opposing piece. At the same time, in its closed position the solenoid armature is, for example, present spaced apart from the armature opposing piece, while in its release position the distance between the solenoid armature and the armature opposing piece is reduced, or these two elements bear one against the other with their end faces.

One development of the disclosure provides that the intermediate component is provided spaced apart in the radial direction from an inner wall of the receptacle opening, the venting opening being formed in the process. Accordingly, in such an embodiment the same applies to the intermediate component as applies to the entire armature opposing piece when a plunger stage is formed. Contact between the armature opposing piece and a solenoid armature in the radial direction would adversely affect the functional capability of the solenoid valve so that such contact should therefore be avoided. This should correspondingly also be the case for the intermediate component. The first embodiment of the venting opening can be provided by spacing the intermediate component apart from the inner wall of the receptacle opening in the radial direction. This means that the fluid can flow through between the intermediate component and the inner wall. Accordingly, the venting opening is formed jointly by an outer wall of the intermediate component and an inner wall of the receptacle opening.

One development of the disclosure provides that the venting opening engages in the radial direction through at least certain areas of a circumferential face of the intermediate component. The venting opening is accordingly embodied as a recess, open at the edge, in the intermediate component, said recess opening in the direction of the circumferential face of the intermediate component. In this context, the venting opening can have any desired orientation. For example, if the intermediate component can extend in the axial direction or obliquely (that is to say at an angle >0° with respect to the axial direction) or in a curved fashion. Of course, the venting opening can also have a plurality of areas with different orientations. There is advantageously provision that the venting opening engages through the circumferential face only in certain areas. This means that it does not extend over the entire circumference of the intermediate component.

In one advantageous embodiment, a plurality of venting openings, which are arranged distributed over the circumference of the intermediate component, particularly in a uniform manner, are provided. An even number of venting openings is advantageously provided, with two of the venting openings lying diametrically opposite one another in each case.

One development of the disclosure provides that the venting opening is open at the edge and/or engages through an end face, facing the solenoid armature, of the intermediate component. As already stated above, the venting opening can be provided open at the edge. Additionally or alternatively there is provision that said venting opening engages through the end face of the intermediate component, which end face faces the solenoid armature. In this context, engagement advantageously occurs only through this end face of the intermediate component, while the venting opening does not extend to an end face lying opposite the end face through which engagement occurs. This end face lying opposite is usually a supporting face with which the intermediate piece is in supporting contact with the pole core.

One development of the disclosure provides that the venting opening has a fluid-guiding face which runs in the axial direction at least in certain areas on the side, facing the solenoid armature, of the intermediate component, and runs in the radial direction at least in certain areas on the opposite side thereof, wherein in particular a curved profile of the fluid-guiding face is provided between the two sides. Fluid flowing through the venting opening flows along the fluid-guiding face. The latter therefore assumes a guiding function for the flowing fluid. The fluid-guiding face will then be arranged in such a way that it runs in the axial direction on one side and in the radial direction on the other side. In order to implement the axial direction, the surface normal to the fluid-guiding face points in the radial direction, while it points in the axial direction for the profile in the radial direction. An axial flow is therefore provided on the side of the intermediate component facing the solenoid armature, and a radial flow is provided on the opposite side. The curved profile of the fluid-guiding face is advantageously provided between the two sides. This causes the fluid to be guided in a way which is favorable in terms of flow, that is to say with the lowest possible flow losses.

One development of the disclosure provides that a plurality of venting openings, which are arranged distributed over the circumference of the intermediate component, are provided. In this context, there is advantageously uniform distribution of the venting openings.

One development of the disclosure provides that a spring element is provided in the receptacle opening, and the intermediate component has a guiding device for the spring element. The spring element serves here in particular to force the solenoid armature in the direction of its home position. The spring element brings about here a corresponding spring force which acts both on the armature opposing piece and on the solenoid armature in order to move the solenoid armature in the direction of its home position. For example, the receptacle opening can be embodied for this purpose as a blind opening, and the spring element can be supported on a base of the blind opening. There is therefore provision that the receptacle opening does not completely engage through the solenoid armature in the axial direction but rather is merely present as a blind opening or pocket. The blind opening therefore has the base which bounds said blind opening in the axial direction of the solenoid armature. The spring element for bringing about the spring force which pushes the solenoid armature into its home position is supported on this base. In this context, the base of the blind opening is advantageously substantially flat or matched to the spring element so that the spring element is prevented from moving or slipping within the blind opening, in particular in the radial direction. For example it is possible to provide that the spring element engages with a side facing the armature opposing piece on the intermediate component.

The spring element which is arranged in the receptacle opening in the solenoid armature is therefore supported on the intermediate component with the side which faces the armature opposing piece. In this context, said spring element rests, for example, on a planar face which faces the solenoid armature or the base of the blind opening. It is advantageous here if this face and the base of the blind opening are essentially parallel to one another, at least in areas in which the spring element is supported on them. The spring element is therefore preferably provided for pushing the solenoid armature away from the intermediate component and therefore the armature opposing piece. The spring force of the spring element can consequently bring about a movement of the solenoid armature, which movement is directed away from the armature opposing piece.

In addition, the intermediate component is to have the guiding device for the spring element. In order to guide the spring element in particular in the radial direction and to prevent buckling of the spring element, the guiding device is provided on the intermediate component. In this context, the guiding device can be embodied, for example, as an axial projection which extends from a supporting element of the intermediate component in the direction of the solenoid armature. The supporting element serves here to support the intermediate component on the pole core. The supporting element and the guiding device ideally have different dimensions in the radial direction in order thus to form the intermediate component as a multiple plunger stage. If the intermediate component and the receptacle opening are round or circular, the supporting element and the guiding device have, for example, different diameters. If the spring element is present as a helical spring, the guiding device advantageously engages in an inner area of this helical spring in order to support the latter in its axial direction or stabilize it.

One development of the disclosure provides that the guiding device has the venting opening at least in certain areas. The venting opening can therefore be formed only on the guiding device or alternatively also on the guiding device and the supporting element. For example, the guiding face can run in the axial direction in the region of the guiding device, and in the radial direction in the region of the supporting element.

The disclosure also relates to a driver assistance device, in particular ABS device, TCS device or ESP device, having at least one solenoid valve, in particular according to the above-mentioned embodiments, wherein the solenoid valve has a solenoid armature, which is operatively connected to a sealing element of the solenoid valve in order to move the same, and an armature opposing piece, which engages at least in certain areas in a receptacle opening in the solenoid armature. In this context there is provision for the armature opposing piece to be composed of a pole core and an intermediate component which is supported on the pole core, wherein only the intermediate component is arranged at least in certain areas in the receptacle opening, and at least one venting opening, which produces a fluid connection between the receptacle opening and the surroundings of the solenoid armature, is present in the intermediate component. The driver assistance device can therefore be implemented in a cost-effective fashion and nevertheless have solenoid valves with good adjustability.

BRIEF DESCRIPTION OF THE DRAWINGS

The disclosure will be explained in more detail below on the basis of the exemplary embodiments illustrated in the drawing, without the disclosure being restricted. In said drawing.

DETAILED DESCRIPTION

Figure 1:
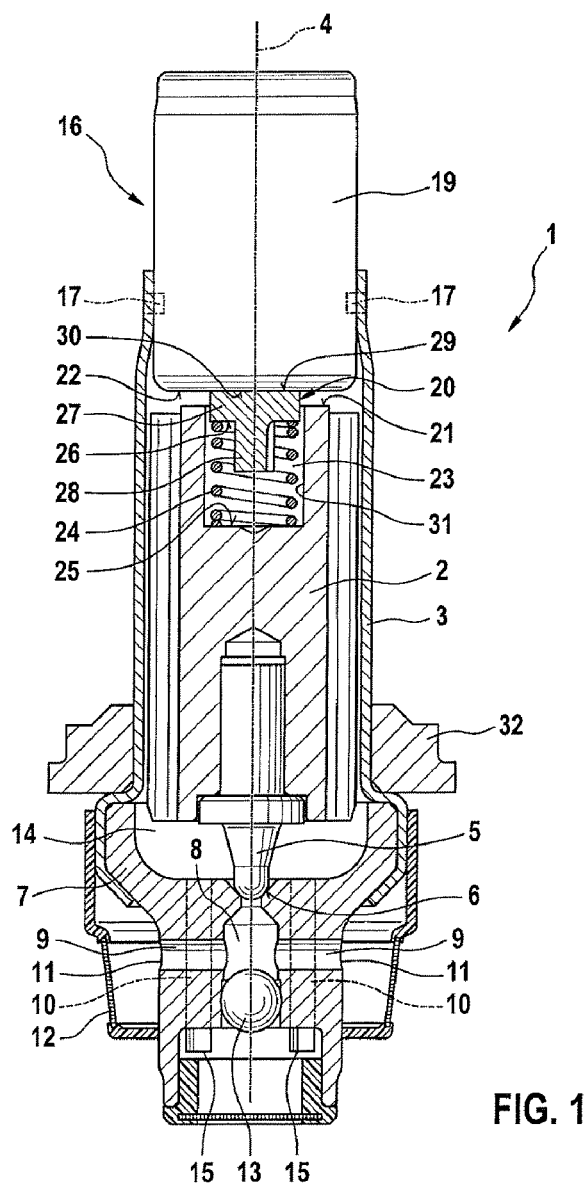
FIG. 1 shows a cross section through a solenoid valve having a solenoid armature and an armature opposing piece, wherein the armature opposing piece is composed of a pole core and an intermediate component, wherein the latter is arranged in a receptacle opening in the solenoid armature.

FIG. 1 shows a cross section through a solenoid valve 1. The solenoid valve 1 has a solenoid armature 2 which is secured in a housing 3 of the solenoid valve 1 in such a way that it can move in the axial direction (longitudinal axis 4 of the solenoid valve 1). The solenoid armature 2 serves to move a sealing element 5, which, for this purpose, is fixedly connected to the solenoid armature 2, for example by said sealing element 5 being screwed or pressed into the solenoid armature 2. The sealing element 5 interacts with a valve seat 6 which is formed in a valve body 7. The valve body 7 is surrounded here at least in certain areas by the housing 3, and therefore secured with respect to the latter. A riser duct 8, at least one inlet duct 9 and at least one outlet duct 10 are formed in the valve body 7, next to the valve seat 6. The inlet duct 9 runs in the radial direction and opens into the riser duct 8. On the side facing away from the riser duct 8, the inlet duct 9 has an inlet port 11, which is formed in a lateral face of the valve body 7 or of the solenoid valve 1.

A fluid can be fed to the solenoid valve 1 through the inlet port 11. Said fluid previously passes through a filter 12 which can be optionally attached to the solenoid valve 1. In the example illustrated here, four inlet ducts 9 and also a large number of outlet ducts 10 are provided, with only two thereof being illustrated in each case. Underneath the junction of the inlet ducts 9 with the riser duct 8, the latter is closed off by means of a closing body 13, which is embodied here as a ball. This ensures that fluid fed through the inlet ports 11 flows through the inlet ducts 9 and the riser duct 8 in the direction of the valve seat 6. The outlet ducts 10 have a continuous fluid-conducting connection to a fluid space 14 of the solenoid valve 1. The fluid space 14 is formed by the valve body 7, the solenoid armature 2 and the housing 3. The valve seat 6 is arranged in the fluid space 14. The sealing element 5 engages at least through certain areas of the fluid space 14. On its side facing away from the fluid space 14, the outlet ducts 10 each have an outlet port 15.

On the side, facing away from the fluid space 14 or the valve body 7, of the solenoid armature 2 an armature opposing piece 16 is provided in the housing 3. Said armature opposing piece 16 is secured in a positionally fixed fashion in the housing 3, for example by means of a clamping effect. In addition, sealing elements 17 can be provided in order to implement a sealed connection between the housing 3 and the armature opposing piece 16. The solenoid armature 2 and the armature opposing piece 16 form, together with at least one coil (not illustrated), a magnetic part of the solenoid valve 1. The solenoid armature 2 is arranged in the region of the coil. However, it is also alternatively possible to arrange the coil in such a way that both the solenoid armature 2 and the armature opposing piece or only the armature opposing piece 16 are arranged in the region of the coil.

The armature opposing piece 16 is composed of a pole core 19 and an intermediate component 20. The solenoid armature 2 has an end face 21, and the pole core 19 has an end face 22 with which the solenoid armature 2 can be supported on the pole core 19. The end faces 21 and 22 therefore form contact faces between the solenoid armature 2 and the pole core 19. The solenoid armature 2 has a receptacle opening 23 which is formed in the end face 21, facing the armature opposing piece 16 or the pole core 19, of the solenoid armature 2 and/or engages through said end face 21. In the exemplary embodiment illustrated here, the receptacle opening 23 is substantially in the shape of a cylinder or circular cylinder. However, the receptacle opening 23 can also have different dimensions in the direction of the longitudinal axis 4, or different diameters, when the receptacle opening 23 is embodied in a circular fashion. The intermediate component 20 and a spring element 24 are arranged at least in certain areas in the receptacle opening 23.

In the embodiment illustrated here, the spring element 24 is embodied as a helical spring and is supported on a base 25 of the receptacle opening 23. The receptacle opening 23 is correspondingly embodied as a blind opening. On the side, facing away from the armature opposing piece 16 or the base 25, of the spring element 24, the latter is supported on the intermediate component 20. In this context, the spring element 24 rests on a face 26 of the intermediate component 20 which is embodied as a planar annular face and is substantially parallel with the base 25. The intermediate component 20 is composed of a supporting element 27 and a guiding device 28. The supporting element 27 faces the pole core 19 here and has a planar supporting face 29, which interacts with a supporting face 30, also planar, of the pole core 19 in order to support the intermediate component 20. The intermediate component 20 is accordingly supported only on the pole core 19, and there is therefore no fixed or rigid connection between the pole core 19 and the intermediate component 20. In particular, there is no positively engaging, frictionally engaging or materially joined connection.

The intermediate component 20 rests on the pole core 19, or the end face 22 thereof, only via the supporting faces 29 and 30. The guiding device 28 serves, in particular, to guide the spring element 24. For this purpose, it is embodied substantially in the form of a mandrel and engages in an inner area of the spring element 24 which is embodied as a helical spring. The spring element 24 is therefore securely protected against buckling or movement in the radial direction. Moreover, the intermediate part 20 is embodied as a multiple plunger stage (here a double plunger stage) by virtue of the different dimensions of the supporting element 27 and of the guiding device 28.

The supporting element 27 has an extent in the radial direction such that it is arranged spaced apart from an inner wall 31 of the receptacle opening 23 in the radial direction. The guiding device 28 has relatively small dimensions. Both the supporting element 27 and the guiding device 28 are advantageously circular, that is to say in the form of a circular cylinder, in section. The distance between the end faces 21 and 22 is referred to as an air gap or as a working air gap. Compared to a solenoid valve which is known from the prior art, the solenoid valve 1 with the intermediate component 20 has the advantage that the magnetic force which can be produced by means of the coil 18, the solenoid armature 2 and the armature opposing piece 16 has a relatively flat and therefore relatively uniform profile across the extent of the working air gap. In particular, as the working air gap increases in size the magnetic force drops to a lesser degree than in the case of the known solenoid valve without an intermediate component 20. Accordingly, the multi-part, in particular two-part, embodiment of the armature opposing piece 16 composed of the pole core 19 and intermediate component 20 significantly improves the adjustability of the solenoid valve 1.

Figure 2:
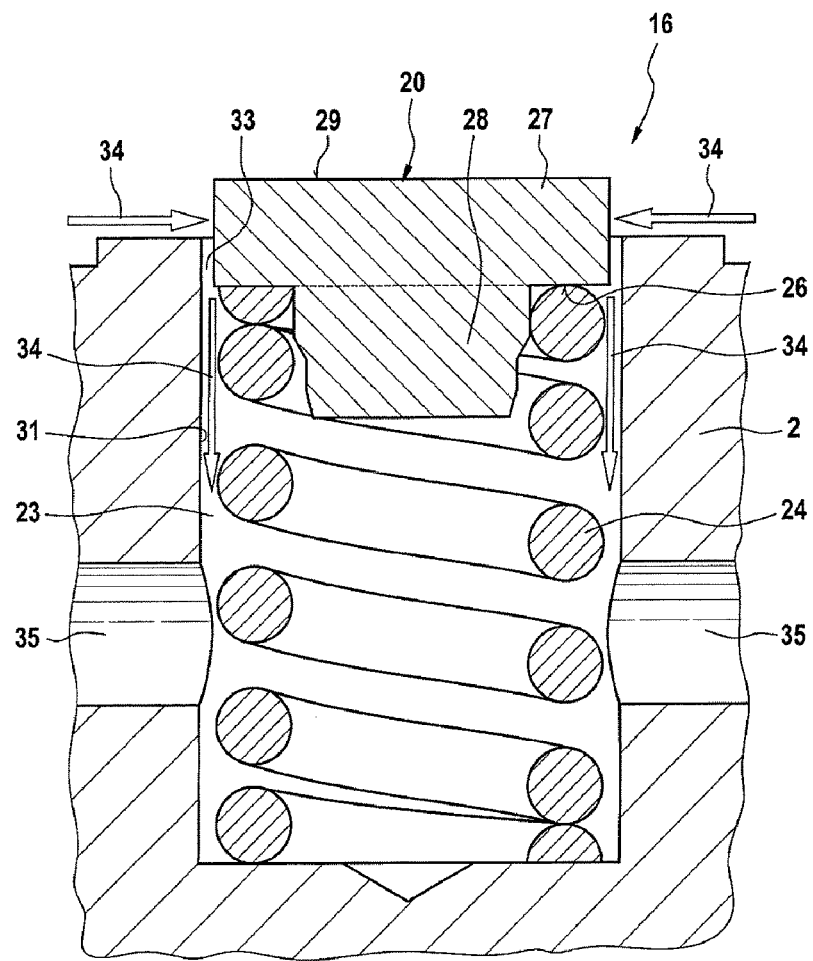
FIG. 2 shows a sectional view of a detail of the solenoid armature and of the intermediate component.

FIG. 2 shows a sectional view of a detail of the solenoid armature 2 with the receptacle opening 23 in which the intermediate component 20 of the armature opposing piece 16 is arranged together with the spring element 24. The intermediate component 20 is composed of the supporting element 27 and the guiding device 28 for guiding the spring element 24. The guiding device 28 is embodied in the form of a mandrel and is surrounded by the spring element 24. The spring element 24 rests, for support, on the face 26 of the supporting element 27. The supporting face 29, which is in contact (not illustrated) with the pole core 19, is provided on the side, lying opposite the face 26, of the supporting element 27. It becomes clear that the supporting element 27 has smaller dimensions in the radial direction than the receptacle opening 23. To this extent, when the intermediate component 20 is moved in the axial direction, fluid can flow through a venting opening 33 which is formed by the spacing apart of the intermediate component 20 and the inner wall 31 of the receptacle opening 23. This is indicated by way of example by the arrows 34, which show a direction of flow which is present when the intermediate component 20 is moved out of the receptacle opening 23.

Additionally or alternatively, radial openings 35, which produce a flow connection from the receptacle opening 23 to a lateral face of the solenoid armature 2, may be provided in the solenoid armature 2. This permits an additional fluid connection to be implemented.

Figures 3, 4:
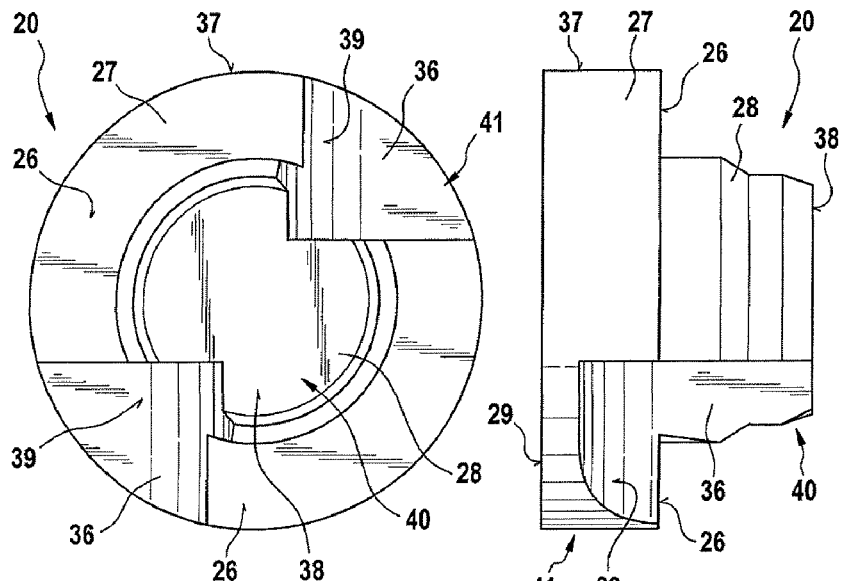
FIG. 3 shows the intermediate component in a view from the direction of the receptacle opening.
FIG. 4 shows the intermediate component in a side view.

FIG. 3 shows the intermediate component 20 in a view from below, that is to say from the direction of the receptacle opening 23. The support element 27 can be seen clearly with the face 26 and the guiding device 28. It is also illustrated that the intermediate component 20 has at least one further venting opening 36. In the embodiment illustrated here, two venting openings 36 are provided, said venting openings 36 being provided lying diametrically opposite one another on the intermediate component 20. The venting openings 36 engage through a circumferential face 37 of the intermediate component 20 or of the supporting element 27, at least in certain areas. There is therefore a flow connection through this circumferential face 37. In this context, the venting opening 36 is formed open at the edge, that is to say is not present in the form of an enclosed duct in the intermediate component 20. In addition to the circumferential face 37, the venting openings 36 also engage through an end face 38, which lies on the side, facing the solenoid armature 2, of the intermediate component 20. A fluid-guiding face 39 is provided in each of the venting openings 36. Said fluid-guiding face 39 runs from a side 40 of the intermediate component 20, on which the end face 38 is located, to a side 41 of the intermediate component 20 which faces away from said end face 38. On the side 40, the fluid-guiding face 39 runs substantially in the axial direction, that is to say in parallel with or coaxially with respect to the longitudinal axis 4 of the solenoid valve 1. In contrast, on the side 41, said fluid-guiding face 39 runs directed outward in the radial direction or at least substantially in the radial direction. A curved profile of the fluid-guiding face 39 is present between the sides 40 and 41, providing optimum guidance of the fluid with the smallest possible flow losses.

FIG. 4 shows the intermediate component 20 in a side view. The curved profile of the fluid-guiding face 39 can be seen clearly here. It also becomes clear that the guiding device 28 has the venting openings 36, at least in certain areas.

Figure 5:
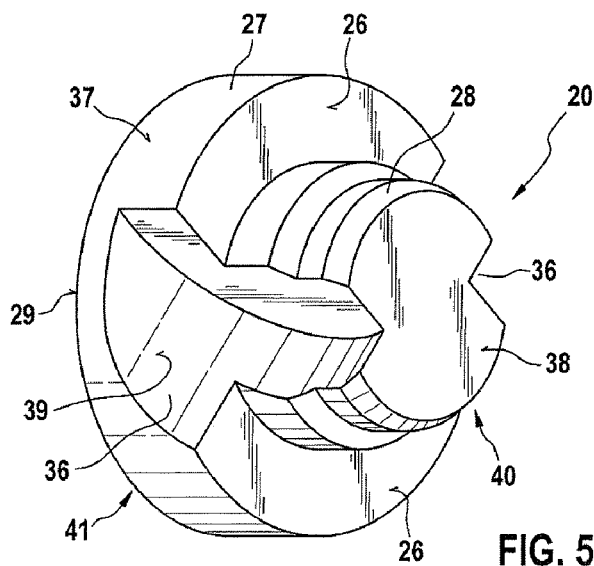
FIG. 5 shows the intermediate component in an isometric view.

FIG. 5 shows an isometric view of the intermediate component 20. The curved profile of the fluid-guiding face 39, with which an axial flow is brought about in the region of the side 40 and a radial flow through the venting opening 36 is brought about, at least in certain areas, on the side 41, can also be clearly seen here.

Figure 6:
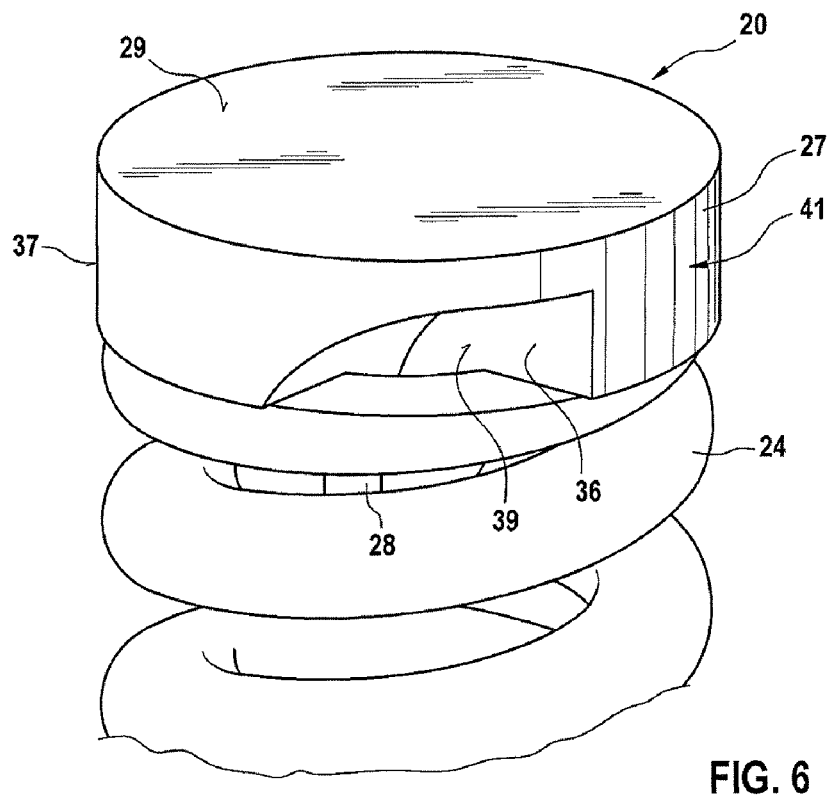
FIG. 6 shows the intermediate component and a spring element adjoining the latter.
Figure 7:
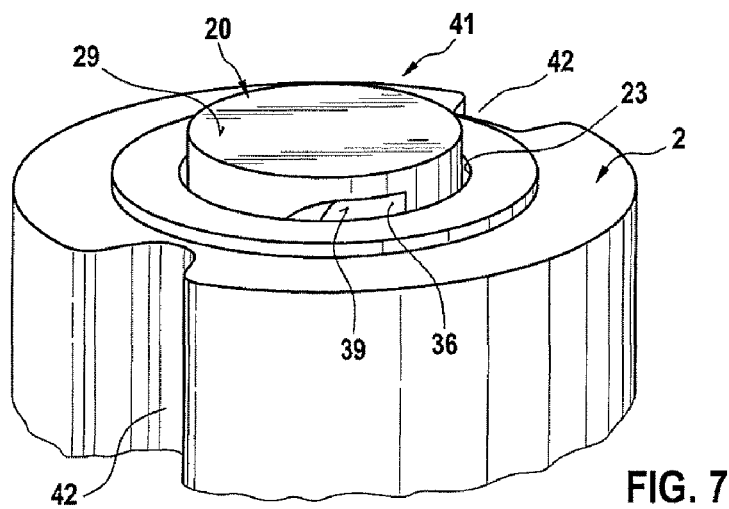
FIG. 7 shows the solenoid armature and the intermediate component arranged in the receptacle opening.

FIGS. 6 and 7 show further views of details of the intermediate component 20. In FIG. 6, the intermediate component 20 is shown together with the spring element 24, while in FIG. 7 the intermediate component 20 is formed in the receptacle bore 23 of the solenoid armature 2. It becomes clear here that the solenoid armature 2 has axial depressions 42. These are connected fluidically to the radial openings 35, with the radial openings 35 leading into the axial depressions 42 here.

What is claimed is:

1. A solenoid valve, comprising:
   a solenoid armature defining a receptacle opening;
   a sealing element attached to the solenoid armature so that movement of the solenoid armature causes movement of the sealing element; and
   an armature opposing piece including (i) a pole core spaced apart from the receptacle opening, and (ii) an intermediate component supported on the pole core, said intermediate component having a circumferential face at least partially positioned within the receptacle opening and an end face facing the solenoid armature and positioned within the receptacle,
   wherein the intermediate component has defined therein at least one venting opening configured to produce a fluid connection between the receptacle opening and a space located outside of the receptacle opening, said venting opening defined in said circumferential face and having a radial and circumferential extent, less than the entire circumference of said circumferential face, to define a fluid guiding face, said fluid guiding face extending axially to said end face and intersecting said circumferential face and said end face.

2. The solenoid valve according to claim 1, further comprising a coil and a housing, wherein:
   the solenoid armature is located within the housing,
   excitation of the coil causes movement of the solenoid armature within the housing, and
   the armature opposing piece is fixed in relation to the housing during excitation of the coil.

3. The solenoid valve according to claim 1, wherein:
   the intermediate component includes a circumferential face, and
   the venting opening is defined at least in part by the circumferential face.

4. The solenoid valve according to claim 1, wherein said fluid-guiding face runs in the axial direction at least in certain areas on a side of the intermediate component facing the solenoid armature, and runs in the radial direction at least in certain areas on an opposite side thereof, said fluid-guiding face having a curved profile between the two sides.

5. The solenoid valve according to claim 1, further comprising a spring located within the receptacle opening, wherein:
   the intermediate component includes a guiding device, and
   the spring is positioned around the guiding device.

6. The solenoid valve according to claim 5, wherein the guiding device defines at least a portion of the venting opening.

7. The solenoid valve according to claim 1, further comprising a housing in which the solenoid armature is located, wherein the space is defined between the housing and the solenoid armature.

8. A solenoid valve, comprising:
   a solenoid armature defining a receptacle opening;
   a sealing element attached to the solenoid armature so that movement of the solenoid armature causes movement of the sealing element; and
   an armature opposing piece including (i) a pole core spaced apart from the receptacle opening, and (ii) an intermediate component supported on the pole core and at least partially positioned within the receptacle opening, wherein the intermediate component has defined therein a plurality of venting openings configured to produce a fluid connection between the receptacle opening and a space located outside of the receptacle opening.

9. A solenoid valve having a solenoid armature which is operatively connected to a sealing element of the solenoid valve in order to move the same, and an armature opposing piece which extends at least in certain areas into a receptacle opening in the solenoid armature, wherein the armature opposing piece includes a pole core and an intermediate component which is supported on the pole core, wherein only the intermediate component is arranged at least in certain areas in the receptacle opening, said intermediate component having a circumferential face at least partially positioned within the receptacle opening and an end face facing the solenoid armature and positioned within the receptacle, and at least one venting opening, which produces a fluid connection between the receptacle opening and surroundings of the solenoid armature, is formed in said circumferential surface of the intermediate component, said venting opening having a radial and circumferential extent, less than the entire circumference of said circumferential face, to define a fluid guiding face, said fluid guiding face extending axially to said end face and intersecting said circumferential face and said end face.

10. A solenoid valve according to claim 9, wherein the solenoid armature is configured to be moved in response to excitation of a coil, and the armature opposing piece is arranged in a substantially positionally fixed fashion in the solenoid valve.

11. The solenoid valve according to claim 9, wherein the venting opening extends in a radial direction through at least certain areas of a circumferential face of the intermediate component.

12. A solenoid valve according to claim 9, wherein said fluid-guiding face runs in the axial direction at least in certain areas on a side of the intermediate component facing the solenoid armature, and runs in the radial direction at least in certain areas on an opposite side thereof, said fluid-guiding face having a curved profile between the two sides.

13. The solenoid valve according to claim 9, further comprising a spring element that is positioned in the receptacle opening, wherein the intermediate component has a guiding device configured to guide the spring element.

14. A solenoid valve according to claim 13, wherein the venting opening is defined at least in part by the guiding device.

15. A solenoid valve having a solenoid armature which is operatively connected to a sealing element of the solenoid valve in order to move the same, and an armature opposing piece which extends at least in certain areas into a receptacle opening in the solenoid armature, wherein the armature opposing piece includes a pole core and an intermediate component which is supported on the pole core, wherein only the intermediate component is arranged at least in certain areas in the receptacle opening, and a plurality of venting openings, which produce a fluid connection between the receptacle opening and surroundings of the solenoid armature, is formed in the intermediate component, wherein the a plurality of venting openings are distributed over a circumference of the intermediate component.

16. A solenoid valve, comprising:
a solenoid armature defining a receptacle opening;
a sealing element attached to the solenoid armature so that movement of the solenoid armature causes movement of the sealing element; and
an armature opposing piece including (i) a pole core spaced apart from the receptacle opening, and (ii) an intermediate component supported on the pole core and at least partially positioned within the receptacle opening, the intermediate component including an end face that faces the solenoid armature,
wherein the intermediate component has defined therein at least one venting opening configured to produce a fluid connection between the receptacle opening and a space located outside of the receptacle opening, the venting opening defined at least in part in and intersecting the end face.

17. A solenoid valve according to claim 16, wherein a fluid-guiding face runs in the axial direction at least in certain areas on a side of the intermediate component facing the solenoid armature and runs in the radial direction at least in certain areas on an opposite side thereof, said fluid-guiding face having a curved profile between the two sides.

18. A solenoid valve, comprising:
a solenoid armature defining a receptacle opening;
a sealing element attached to the solenoid armature so that movement of the solenoid armature causes movement of the sealing element;
a spring located within the receptacle opening, and
an armature opposing piece including (i) a pole core spaced apart from the receptacle opening, and (ii) an intermediate component supported on the pole core and at least partially positioned within the receptacle opening, the intermediate component including a main portion sized to be received within said receptacle opening and a spring guiding device sized to be received within said spring and having an end face,
wherein the intermediate component has defined therein at least one venting opening configured to produce a fluid connection between the receptacle opening and a space located outside of the receptacle opening, the venting opening defined in and extending from said main portion to said end face of said spring guiding device, said venting opening intersecting said end face.

19. A solenoid valve according to claim 18, wherein a fluid-guiding face runs in the axial direction at least in certain areas on a side of the intermediate component facing the solenoid armature and runs in the radial direction at least in certain areas on an opposite side thereof, said fluid-guiding face having a curved profile between the two sides.

* * * * *

UNITED STATES PATENT AND TRADEMARK OFFICE
CERTIFICATE OF CORRECTION

| | | |
|---|---|---|
| PATENT NO. | : 8,590,859 B2 | Page 1 of 1 |
| APPLICATION NO. | : 12/976651 | |
| DATED | : November 26, 2013 | |
| INVENTOR(S) | : Edgar Kurz | |

It is certified that error appears in the above-identified patent and that said Letters Patent is hereby corrected as shown below:

In the claims:

Claim 15, line 12 (col. 12, line 3 and 4):

Replace "wherein the a plurality of venting openings" with -- wherein the plurality of venting openings --

Signed and Sealed this
Twenty-third Day of September, 2014

Michelle K. Lee
*Deputy Director of the United States Patent and Trademark Office*